United States Patent
Schorr et al.

(10) Patent No.: US 9,453,719 B2
(45) Date of Patent: Sep. 27, 2016

(54) MEASURING APPLIANCE COMPRISING AN AUTOMATIC REPRESENTATION-CHANGING FUNCTIONALITY

(75) Inventors: Christian Schorr, St. Gallen (CH); Frank Schroeder, St. Gallen (CH); Romy Koch, Widnau (CH); Kurt Giger, Rüthi (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 460 days.

(21) Appl. No.: 13/979,121

(22) PCT Filed: Jan. 10, 2012

(86) PCT No.: PCT/EP2012/050301
§ 371 (c)(1),
(2), (4) Date: Jul. 10, 2013

(87) PCT Pub. No.: WO2012/095416
PCT Pub. Date: Jul. 19, 2012

(65) Prior Publication Data
US 2013/0293705 A1 Nov. 7, 2013

(30) Foreign Application Priority Data
Jan. 14, 2011 (EP) .................................... 11150978

(51) Int. Cl.
*G01B 11/22* (2006.01)
*G01B 11/24* (2006.01)
(Continued)

(52) U.S. Cl.
CPC ............. *G01B 11/24* (2013.01); *G01C 15/002* (2013.01); *G01B 11/22* (2013.01); *G01B 11/28* (2013.01);
(Continued)

(58) Field of Classification Search
None
See application file for complete search history.

(56) References Cited

U.S. PATENT DOCUMENTS

| | | |
|---|---|---|
| 5,819,424 A | 10/1998 | Ohtomo et al. |
| 7,460,214 B2 | 12/2008 | Schiavi |
| 7,460,216 B2 | 12/2008 | Lecomte et al. |
| 7,679,727 B2 | 3/2010 | Benz et al. |
| 7,742,176 B2 | 6/2010 | Braunecker et al. |
| 2006/0184013 A1* | 8/2006 | Emanuel .................. G01S 5/16 600/426 |

(Continued)

FOREIGN PATENT DOCUMENTS

CN 1145471 A 3/1997
DE 44 43 413 A1 6/1996
(Continued)

OTHER PUBLICATIONS

European Search Report dated Oct. 14, 2011 as received in Application No. EP 11 15 0978.

*Primary Examiner* — Anner Holder
*Assistant Examiner* — William Adrovel
(74) *Attorney, Agent, or Firm* — Maschoff Brennan (57) ABSTRACT

A measuring appliance in which inputted or measured spatial points and a horizontal projection representation or spatial representation of at least some spatial points from the quantity of spatial points can be displayed, said points being at least partially connected by lines. The measuring appliance has a representation-changing functionality in the framework of which, according to a line selected on the user side from the lines displayed in a horizontal projection representation or a spatial representation, in an automatically controlled manner by means of the evaluation and control unit: a virtual surface is defined by the selected line and a direction provided as the vertical; a subset of spatial points is selected from the quantity of spatial points, lying inside a buffer zone surrounding the virtual surface in a defined manner; and a vertical projection representation of exclusively such spatial points pertaining to the subset is displayed on the display.

21 Claims, 7 Drawing Sheets

(51) Int. Cl.

| | |
|---|---|
| *G01B 11/28* | (2006.01) |
| *G01C 1/02* | (2006.01) |
| *G01C 9/00* | (2006.01) |
| *G01C 9/06* | (2006.01) |
| *G01C 15/00* | (2006.01) |
| *G01C 15/02* | (2006.01) |
| *G06T 7/00* | (2006.01) |
| *G06T 7/60* | (2006.01) |
| *G01S 17/02* | (2006.01) |
| *G01S 17/89* | (2006.01) |
| *G01S 17/06* | (2006.01) |
| *G01C 3/08* | (2006.01) |

(52) U.S. Cl.
CPC . *G01C 1/02* (2013.01); *G01C 3/08* (2013.01); *G01C 9/00* (2013.01); *G01C 9/06* (2013.01); *G01C 15/004* (2013.01); *G01C 15/02* (2013.01); *G01S 17/023* (2013.01); *G01S 17/06* (2013.01); *G01S 17/89* (2013.01); *G06T 7/0051* (2013.01); *G06T 7/0057* (2013.01); *G06T 7/602* (2013.01); *G06T 2207/10028* (2013.01)

(56) References Cited

U.S. PATENT DOCUMENTS

| | | | |
|---|---|---|---|
| 2008/0137102 | A1 | 6/2008 | Hoffmann et al. |
| 2009/0138233 | A1* | 5/2009 | Kludas ............... G01C 15/00 702/158 |
| 2009/0167761 | A1* | 7/2009 | Hayashi ............. G01B 11/24 345/424 |
| 2010/0296075 | A1* | 11/2010 | Hinderling .......... G01C 3/08 356/3 |
| 2011/0288818 | A1* | 11/2011 | Thierman ........... G01B 11/00 702/159 |

FOREIGN PATENT DOCUMENTS

| | | |
|---|---|---|
| DE | 195 45 589 A1 | 6/1997 |
| DE | 196 48 626 A1 | 5/1998 |
| DE | 10 2008 001617 A1 | 11/2009 |
| EP | 1 517 117 A1 | 3/2005 |
| EP | 1 724 609 A1 | 11/2006 |
| EP | 1 733 185 A1 | 12/2006 |
| EP | 2 405 236 A1 | 1/2012 |
| EP | 2 423 640 A1 | 2/2012 |
| JP | 3-101151 | 4/1997 |
| WO | 96/18083 A1 | 6/1996 |
| WO | 2008/138541 A1 | 11/2008 |

* cited by examiner

Fig. 2

MEASURING APPLIANCE COMPRISING AN AUTOMATIC REPRESENTATION-CHANGING FUNCTIONALITY

FIELD OF THE INVENTION

The invention relates to a measuring appliance for measuring and/or marking spatial points in the context of construction and/or development—in particular interior finishing—of buildings and to an associated method and an associated computer program product.

A further aspect according to the invention relates to a system comprising a construction measuring appliance and at least three reference point marks which can be fitted in spaces and to a construction measuring appliance suitable for precisely such a system.

BACKGROUND

The prior art discloses construction measuring appliances comprising a sighting device, with the aid of which a spatial point, e.g. a corner point of a space, is sighted manually and the sighting direction is then changed manually to a next spatial point to be measured, e.g. a further corner point.

DE 196 48 626 for example discloses a method and an apparatus for area measurement with a laser distance measuring device having a laser transmitter and a laser receiver. The laser distance measuring device is mounted on a stand. The apparatus furthermore comprises a tilting and rotating device for alignment and direction measurement, a telescopic sight and also an electronic evaluation unit for angle data acquisition, distance data acquisition and data transfer to a computer. For measuring a space, the appliance is positioned at a central location in the space, from which all spatial and/or area corner points to be detected can be sighted and impinged upon by the laser beam. In accordance with the disclosure of DE 196 48 626, the spatial points to be measured are in this case each sighted individually, if appropriate—in the case of relatively large distance—with the observation being supported by means of a telescopic sight. An automated sequential measurement of a plurality of spatial points, comparable to a scan, for example, or functionalities that can be initiated for user-defined changes between three- and two-dimensional representations of measured spatial regions are not disclosed in DE 196 48 626.

A similar apparatus and associated measurement method are disclosed in DE 44 43 413, the supplementary published patent application DE 195 45 589 and WO 96/18083, which claims the priority of DE 44 43 413. They describe a method and an apparatus for measuring and marking on distant lines, areas or in at least partly closed spaces. One or a plurality of relevant spatial points are measured according to in each case two solid angles and the distance relative to a reference location by means of a laser distance measuring appliance mounted in a cardan-type fashion. The laser distance measuring appliance is pivotable about two mutually perpendicular axes equipped with goniometers. In accordance with one embodiment described in said documents, spatial points to be measured are headed for manually and marking points are calculated from the measurement data, on the basis of a predefined relative relation between measurement and marking, said marking points then being moved to automatically by the measuring and marking apparatus.

However, this document also does not disclose an automated sequential measurement of a plurality of spatial points, comparable to a scan, for example, or functionalities that can be initiated for user-defined changes between three- and two-dimensional representations of measured spatial regions.

EP 1 733 185 discloses an apparatus and a method whereby specifically edges on a polygonal, otherwise planar surface are intended to be measured precisely. However, an automated sequential measurement of a plurality of spatial points or functionalities that can be initiated for user-defined changes between three- and two-dimensional representations of measured spatial regions are not disclosed.

SUMMARY

The problem addressed by the invention is that of providing a measuring appliance and an associated method for measuring and marking spatial points in a construction, in particular an interior of a building, whereby a simple and rapid change from an initial representation of stored or already measured points of a space to an elevation representation of the space is made possible, which elevation representation is displayed on the display and can be read and interpreted in a simple manner.

This problem is solved by the realization of the characterizing features of the independent claims. Features which develop the invention in an alternative or advantageous manner can be gathered from the dependent patent claims and also the description including the descriptions of the figures. All embodiments of the invention which are illustrated or disclosed in some other way in this document can be combined with one another, unless expressly stated otherwise.

The invention relates to a measuring appliance for measuring and in particular marking spatial points of a construction—in particular interiors of buildings.

The measuring appliance comprises a base, a sighting unit, which is rotatable and pivotable relative to the base and provides distance measuring functionality, having a laser source designed to emit a laser beam in the direction of an aiming axis, and a laser light detector, an evaluation and control unit and a display. In this case, a spatial alignment of the sighting unit relative to the base is detectable by means of two goniometers. Moreover, the is connected to the laser source, the laser light detector and also the goniometers in order to assign a detected distance to a corresponding alignment and thus to determine coordinates for spatial points. Furthermore, input or measured spatial points, which form a spatial point set, can be stored, for example in storage means provided by the evaluation and control unit.

Furthermore, a plan view representation or spatial representation of at least some spatial points from the spatial point set can be displayed on the display, wherein said spatial points are at least partly connected by lines.

According to the invention, then, the measuring appliance has a representation-changing functionality, in the context of which, depending on a line selected—from the lines displayed in the plan view representation or the spatial representation—by the user, in a manner automatically controlled by the evaluation and control unit, a virtual area is defined by the selected line and a direction predefined as vertical, a subset of spatial points which lie within a buffer zone surrounding the virtual area in a defined manner is selected from the spatial point set, and an elevation representation of exclusively such spatial points which belong to the subset is displayed on the display.

In particular, in the context of the elevation representation exactly all chose spatial points which belong to the subset are represented, wherein they are at least partly connected by lines in the elevation representation as well.

In this case, the buffer zone can extend in front of and behind the virtual area as far as a defined maximum distance from the virtual area, in particular wherein a value for the maximum distance is fixedly predefined or can be predefined by the user in a range of between 0 and 100 cm, specifically in a range between 10 and 50 cm.

In accordance with one advantageous aspect, the representation-changing functionality according to the invention can be started automatically as a result of the one line being selected by the user—in particular by double clicking with the aid of input means—whereupon automatically—in particular directly in response to the selection by the user—the virtual area is defined, the subset is selected and a change is made to the elevation representation and this is displayed on the display.

In this case, spatial representation is defined as a three-dimensional perspective representation of spatial points.

The plan view representation is defined as a two-dimensional representation of spatial points —projected onto a plane assumed to be aligned horizontally—and the elevation representation is defined as a two-dimensional representation of spatial points—projected onto a plane assumed to be aligned vertically.

In particular, the measuring appliance can comprise—in particular integrated into the base—inclination sensor means designed for determining the inclination relative to the Earth's gravitational field vector about two axes and for communicating the measurement data thereof to the evaluation and control unit, such that the direction predefined as vertical can thereby be defined or measured.

Alternatively, the direction predefined as vertical can also be derived by a precalibration of a reference situated with known outer alignment, in particular of two points of a plumb rod or plumb bob suspended in oscillating fashion, or of a reference plane assumed to be aligned horizontally or vertically. The outer vertical direction can then be derived on the basis of the data obtained in the context of the recalibration by means of the evaluation and control unit.

The change from plan view representation to elevation representation is entirely customary in CAD systems, such as are employed primarily for construction purposes. However, a change of point sets to be displayed in the different modes of representation has to be decided and assigned point by point by the user, and cannot be performed by a simple wholesale selection in the sense of a buffer zone defined depending on a selected line, such as is employed according to the invention. Consequently, this point-by-point selection process is time-consuming and does not meet the requirements made in respect of a system which is easy to operate and which, for the purposes of dimension detection, for example, must not only be easily understandable but also be operable time-efficiently. In particular, what can be achieved according to the invention is that, for a system user, it is possible to avoid the need to individually select a large number of individual points just in order to ensure an improved clarity of a representation chosen for a short time.

Preferably, the distances in the horizontal and/or vertical direction from the line connecting the selected spatial points for the definition of the buffer zone for measured spatial points contained therein for representation in the two-dimensional projection are between 0 cm and 50 cm, particularly preferably between 0 cm and 20 cm.

In accordance with one particular embodiment of the invention, the buffer zone contains spatial points which are measured from a space adjoining the first measured space and the three-dimensional coordinates of which can be correlated with the three-dimensional data of the measured spatial points of the first measured space and can be represented in the two-dimensional projection. This can be made possible, for example, by measurement of spatial points at common walls of mutually adjoining spaces and storage and correlation of these data.

Further subject matter of the invention is a method for changing the representation from a plan view representation or spatial representation displayed on a display of a measuring appliance to an elevation representation, wherein the measuring appliance—as described above—comprises:
 a base,
 a sighting unit, which is rotatable and pivotable relative to the base and provides distance measuring functionality, having a laser source designed so emit a laser beam in the direction of an aiming axis, and a laser light detector,
 an evaluation and control unit, and
 a display
 wherein
 a spatial alignment of the sighting unit relative to the base is detectable by means of two goniometers,
 the is connected to the laser source, the laser light detector and also the goniometers in order to assign a detected distance to a corresponding alignment and thus to determine coordinates for spatial points.
 input or measured spatial points, which form a spatial point set, are stored and
 the plan view representation or spatial representation of at least some spatial points from the spatial point set is displayed, wherein said spatial points are at least partly connected by lines.

According to the invention, to the context of the method, depending on a line selected—from the lines displayed in the plan view representation or the spatial representation— by the user, automatically
 a virtual area is defined by the selected line and a direction predefined as vertical,
 a subset of spatial points which lie within a buffer zone surrounding the virtual area in a defined manner is selected from the spatial point set, and
 an elevation representation of exclusively each spatial points which belong to the subset is displayed on the display.

All of the developments described initially with regard to the measuring appliance according to the invention are analogously also applicable to the method according to the invention.

Thus, once again the buffer zone can extend in front of and behind the virtual area as far as a defined maximum distance from the virtual area, in particular wherein a value for the maximum distance is fixedly predefined or can be predefined by the user in a range of between 0 and 100 cm, specifically in a range between 10 and 50 cm.

Furthermore, in the context of the elevation representation exactly all those spatial points which belong to the subset are represented, wherein said spatial points can be at least partly connected by lines.

Specifically, an automatic progression of the method can be initiated or started as a result of the one line being selected by the user—in particular by double clicking with the aid of input means—whereupon automatically—in particular directly in response to the selection by the user—the virtual area is defined, the subset is selected and a change is made to the elevation representation and this is displayed on the display.

Further subject matter of the invention is a computer program product comprising program code, stored on a machine-readable carrier, for carrying out the method according to the invention for changing the representation from a plan view representation or spatial representation displayed on a display of a measuring appliance to an elevation representation of special points from a stored spatial point set, according to one of the abovementioned embodiments, in particular if the program is executed on an electronic data processing unit embodied as an evaluation and control unit of the above-described measuring appliance according to the invention.

BRIEF DESCRIPTION OF THE DRAWINGS

The measuring appliance according to the invention and the associated method are described in greater detail purely by way of example below on the basis of concrete exemplary embodiments illustrated schematically in the drawings, and further advantages of the invention are also discussed. Specifically in the figures.

DETAILED DESCRIPTION

Figure 1:
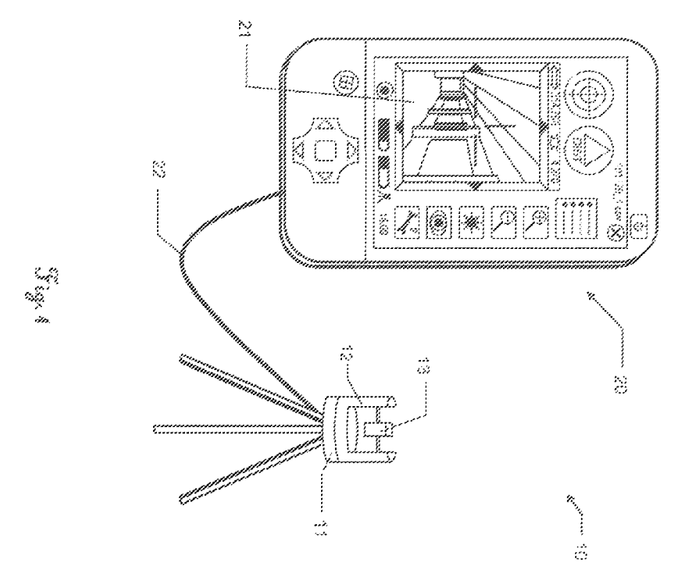
FIG. 1 illustrates a first illustration for a possible embodiment of a construction measuring appliance according to the invention.

FIG. 1 shows one possible embodiment of a construction measuring appliance 10 according to the invention. The system 10 comprises a supervisory unit 20 having an integrated evaluation and control unit for processing the data and having a touch-sensitive touch display 21 for displaying data/camera images and for marking display points (and inputting commands). The supervisory unit 20 (as user-appliance interface) and a laser light detector or sensor communicate with one another. The supervisory unit 20 and the laser light detector or sensor can be physically separate and be connected to one another by means of wireless or cable-based communication connections 22 or can be provided as one unit. In order to align the laser beam 14 with spatial points to be measured or to be protected, at least the laser beam 14 can serve as a measurement beam itself. In order to support an operator for sighting a spatial point, the construction measuring appliance 10 can additionally be equipped with a direct optical sighting aid, e.g. a telescope.

The camera image, into which, in the context of a sighting mode, a reticle can be inserted at any location in the image which corresponds to the aiming axis, thus serves in particular for sighting the desired target points in the space and can be displayed e.g. on the display of a remote control unit that can be handheld for the construction measuring appliance (in particular as a live video stream).

As to known to the person skilled in the art, the evaluation and control unit and also the display and the input means can either be arranged directly on the base of the appliance and/or be integrated into a remote control unit that can be handheld. The measuring appliance can therefore have, for example, a base part that integrates the sensor-type components and—physically separated therefrom—a remote control unit, which, for its part, provides the input means and the display and, in particular, also the evaluation and control unit.

According to the invention, the construction measuring appliance 10 has a representation-changing functionality which proceeds at least semiautomatically, which is illustrated, however, in particular with reference to FIGS. 2 to 5.

Figure 2:
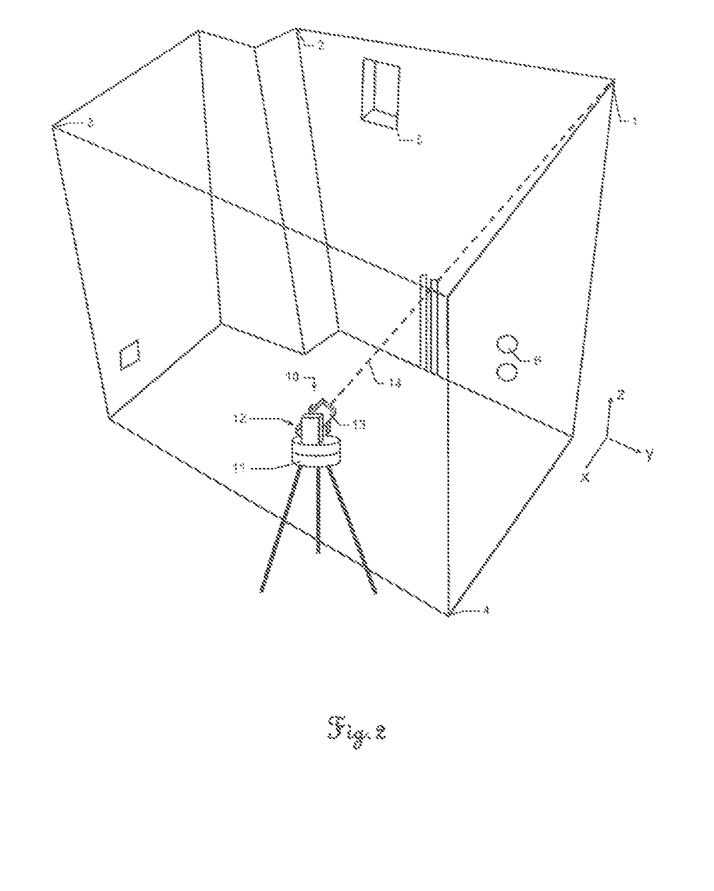
FIG. 2 illustrates a second illustration for a possible embodiment of a construction measuring appliance according to the invention.

FIG. 2 shows a measuring appliance 10 according to the invention for measuring and/or for marking spatial points of surfaces of a construction, in particular of interiors of buildings.

The construction measuring appliance 10 comprises a base 11, which is supported for example on a tripod stand, with an upper part 12 mounted thereon in a rotatable manner. A sighting unit 13 mounted on the upper part 12 in a pivotable manner is equipped with a laser source designed to emit a laser beam 14, and a laser light detector as distance determining detector, and thus provides a distance measuring functionality. The sighting unit 13 can furthermore optionally be equipped with an integrated digital camera.

Consequently, the sighting unit 13 is therefore rotatable and pivotable relative to the base 11 (that is to say in particular rotatable about a vertical axis and pivotable or inclinable about a horizontal pivoting axis).

The construction measuring appliance 10 additionally comprises an evaluation and control unit (not illustrated for the sake of simplification), wherein—likewise not illustrated—a first and a second rotary drive make the upper part 12 and the sighting unit 13 respectively drivable and alignable in an azimuth angle and an elevation angle. The spatial alignment of the sighting unit 13 relative to the base 11 is detectable by means of two goniometers. The evaluation and control unit is connected to the laser source, the laser light detector and the goniometers—and also, if appropriate, the inclination sensors—in order to assign a detected distance and detected azimuth and elevation angles to a corresponding alignment of the sighting unit 13 and thus to determine coordinates for spatial points.

If a camera is present, then in this case, in the operating state, the spatial point respectively currently sighted by means of the aiming axis 13 or the laser beam 14 can be represented on the display in a recorded camera image (in a target image point), in particular in a manner indicated on the basis of a reticle that can be represented.

The camera image, into which therefore the reticle can be inserted at that location in the image which corresponds to the aiming axis, therefore serves in particular for sighting the desired target points in the space and can be displayed e.g. on the display of a remote control unit, which can be handheld, for the construction measuring appliance in particular as a live video stream).

As known to the person skilled in the art, the evaluation and control unit and also the display and the input means can either be arranged directly on the base of the appliance and/or be integrated into a remote control unit, which can be handheld (as already mentioned in the context of the description in FIG. 1). The measuring appliance can therefore have (either exclusively or in addition to a user interface with display and input means which can be arranged directly on the base) a remote control unit with input means and the display.

In addition, the measuring appliance 10—in particular in a manner integrated into the base 11 of the appliance 10—can optionally be equipped with inclination sensor means, the measurement data of which are then likewise communicated to the evaluation and control unit. Therefore, it is additionally possible to determine the current installation alignment or horizontality of the appliance 10 (that is to say an inclination of the base 11) with respect to the Earth's gravitational field vector and to use it to compensate, in particular computationally, for the appliance 10 not being installed exactly horizontally. As known to the person skilled in the art, in this case the inclination sensor meant can be designed to determine the inclination relative to the gravitational field (or relative to a horizontal plane aligned perpendicularly to the gravitational field) in two directions (that is to say about two axes). By way of example, for this purpose it is possible to use two one-axis inclination sensors or one two-axis inclination sensor (such as optoelectronic spirit level sensors, an optoelectronic oil reservoir or an optoelectronic boz level). An example of such an oil-reservoir-like inclination sensor which can be used to determine the inclination at least about two axes is described in derail in the European patent application having the application number EP 10173726.0.

FIGS. 2, 3, 4 and 5 show in joint consideration the measurement of a space having a plurality of walls and the application of the functionality according to the invention or of the method according to the invention, wherein for example the spatial points 1, 2, 3, 4 have already been measured and stored and further spatial points 5, 6 were input by the user (e.g. by transferring external design data to the evaluation and control unit) and are stored therein.

According to the invention, the construction measuring appliance 10 has a representation-changing functionality, in the context of which, depending on a line chosen by the user from the lines displayed in the plan view representation (A) or the spatial representation, automatically in a manner controlled by the evaluation and control unit, a is defined the selected line and a direction predefined as vertical, a subset of spatial points (1, 2, 3, 4) which lie within a buffer zone (7) surrounding the virtual area in a defined manner is selected from the spatial point set, and an elevation representation (B) of exclusively such spatial points (1, 2, 3, 4) which belong to the subset is displayed on the display.

In other words, only spatial points situated within a defined buffer zone 7 (see FIG. 4), said buffer zone being defined by fixedly predefined (or predefinable) distances from the area containing the selected line, are represented in the evaluation representation (B). Those spatial points from the entire spatial point set or those spatial points illustrated in the initial representation which do not lie within said buffer zone are filtered out before the change to the elevation representation (B) and are not represented there.

The buffer zone 7 (see FIG. 4) extends in front and behind the virtual area as far as a defined maximum distance from the virtual area, in particular wherein a value for the maximum distance is fixedly predefined or can be predefined by the user in a range of between 0 and 100 cm, specifically in a range between 10 and 50 cm.

According to the invention, then, it is thus possible to implement both the alignment and the type of representational form of spatial points of a stored spatial point set, and in particular in this respect also the selection of the points to be selected for the elevation B, in a single user work step, wherein the entire process is sufficiently defined solely by the selection of the desired line by the user.

This functionality—simple for the user to Operate—for changing between different modes of representation of a space is primarily provided for use by a regular craftsperson, that is to say is suitable in particular for persons who are not specially trained or experienced in measurement technology.

The initial situation for this newly provided functionality is that conventional appliances with conventional possibilities for representing the measurement data usually present a superimposition—which is very unclear for a user—of spatial points lying in common vertical planes (e.g. ceiling and floor) with spatial points lying in common horizontal planes (e.g. on different walls). The new development functionality enables an operator to change between view from above ("plan view A", in accordance with FIG. 3) and lateral or frontal view ("elevation B", in accordance with FIG. 5) of the stored measurement data, in particular by selecting a line which connects measured spatial points 1, 2 and which is intended to be contained in the elevation representation B.

Therefore, an advantage of the invention is the rapid visualization of the measurement geometry from different views, namely plan view (A) and elevation (B), wherein in particular the selection of the points to be represented in elevation (B)—in order to avoid lack of clarity—is performed automatically by using a predefined buffer zone. Consequently, three-dimensional data such as arise e.g. from the dimensioning of an interior can be converted into two clear two-dimensional views.

Figure 3:
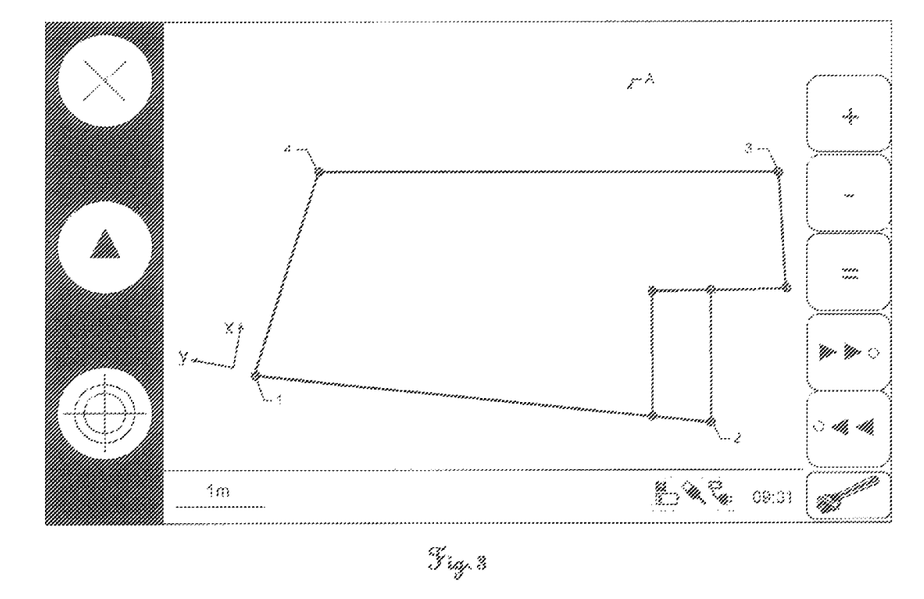
FIG. 3 shows a plan view representation of stored and already measured points of the space, said representation being displayed on the display of the appliance.
Figure 4:
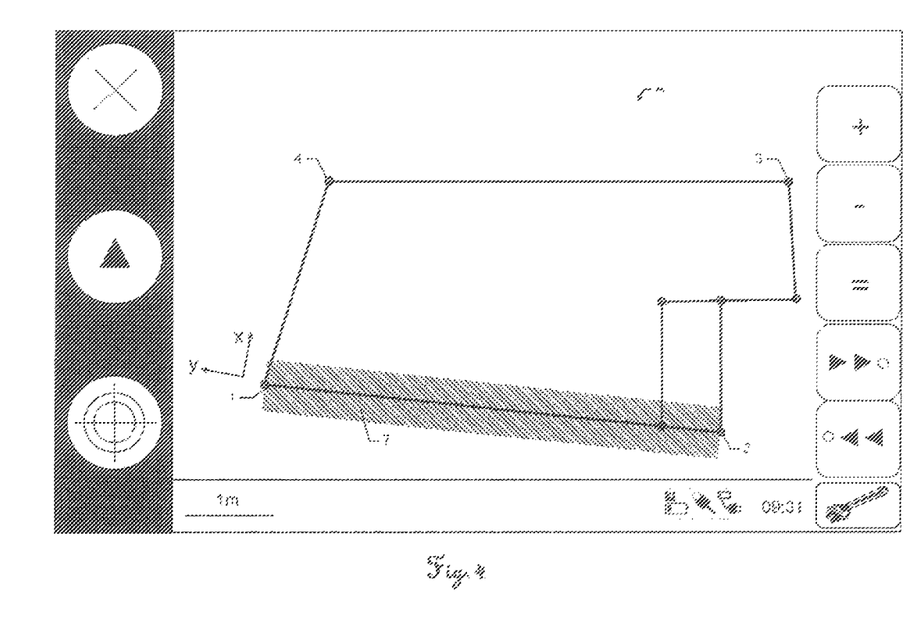
FIG. 4 shows an example of determining the buffer zone around the vertical area defined by the selected line.

View A (plan view representation) is characterized by orthogonal projection of the points into a horizontal plane, wherein a reference to the outer vertical or horizontal direction can be established e.g. by the above-described inclination sensor means or by prior calibration of an outer reference assumed to be aligned precisely vertically or to be aligned precisely horizontally.

The plan view representation A can therefore be designated as a two-dimensional representation of spatial points—projected onto a plane assumed to be aligned horizontally.

Figure 5:
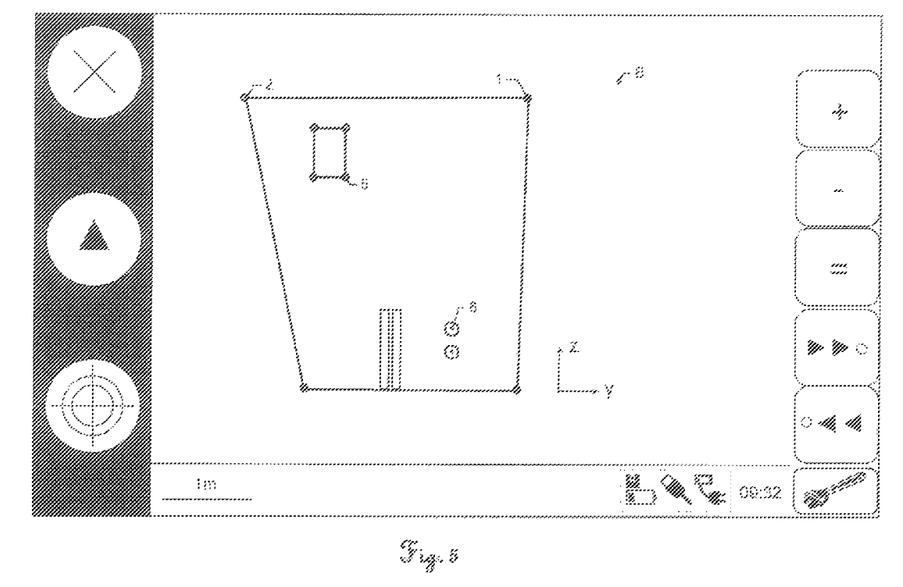
FIG. 5 allows an elevation representation of the spatial points lying exclusively within the buffer zone, said elevation representation being displayed according to the invention on the display of the appliance.

View B (elevation representation) is characterized by orthogonal projection of the points into a plane containing the Z-axis of the coordinate system.

The elevation representation B can therefore be designated as a two-dimensional representation of spatial points—projected onto a plane assumed to be aligned vertically.

Furthermore, the 2D elevation representation B is predefined by a line to be selected by a user, for example the connecting line between the spatial points 1 and 2. In particular, this line can represent for example the edge of a wall which runs approximately horizontally.

The line from point 1 to point 2 as displayed in the plan view representation A in FIG. 2 could be selected by the user, for example, by selection in the graphical user interface (GUI) by means of arrow keys (or a trackball, a touchpad, a trackpoint [pointing stick], etc.) or by touching (tapping) a touchscreen, or by some other manner appropriate for a GUI.

The plan view representation A (FIG. 3) thereupon changes automatically then to the elevation view B (FIG. 5) and uses the selected line between the points 1 and 2 as the direction determining the view B (i.e. in this case as seen from the opposite wall of the space illustrated in FIG. 2). At the same time, only those spatial points 1, 2, 5, 6 are displayed which lie within the buffer zone surrounding the vertical area—containing the line 1-2—as far as a defined maximum distance. In this case, the buffer zone 7 is defined here as the spatial region which extends as far as a fixed maximum distance of e.g. 20 cm in front of and behind the vertical area containing the line 1-2. In this case, therefore, the buffer zone 7 is a column extending in the vertical direction with the rectangular area 7 illustrated in a hatched manner in FIG. 4 as the cross-sectional area of the column, wherein the rectangular area 7 surrounds the line 1-2 in such a way that the line 1-2 forms the mid-perpendicular (also called perpendicular bisector) of the two longitudinal sides of the rectangular area 7 and the distance from the two longitudinal sides to the line 1-2 corresponds to the predefined (or predefinable distance).

Without such a selection with the aid of the buffer tone, the elevation view B would be unclear. By way of example, the points 3 and 4 from the opposite wall—in the case of an elevation representation of all detected spatial points—would then also be represented, which might adversely affect the benefit of a change of view with regard to the readability of information about measured spatial points and delay the dimension measuring process.

Figure 6:
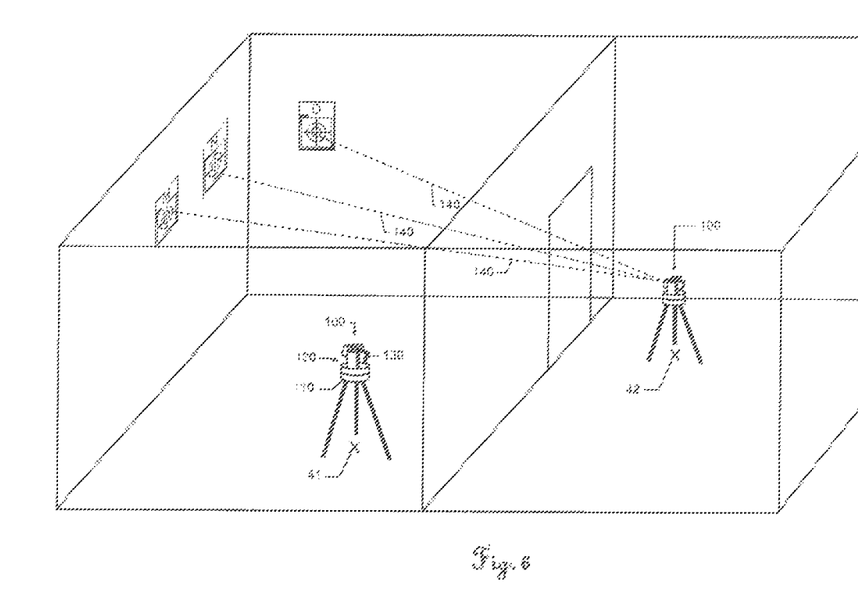
FIG. 6 shows a measuring system designed in accordance with a further aspect of the invention in its application.
Figure 7:
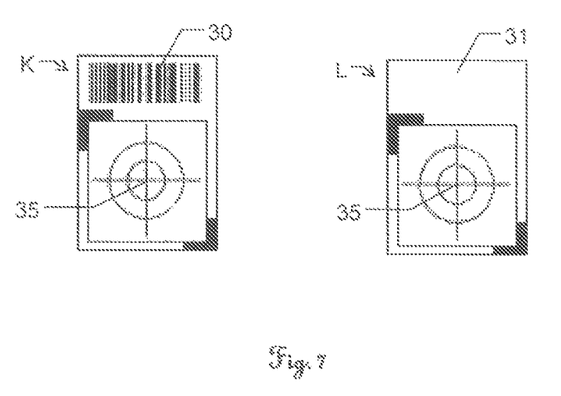
FIG. 7 shows exemplary embodiments of reference point marks of the measuring system designed in accordance with the further aspect of the invention.

FIGS. 6 and 7 relate to a further aspect of the invention, which can optionally be combined with the above-described measuring apparatus or the above-described method, but can also be employed totally separately from the above-described representation-changing functionality according to the invention.

FIG. 6 shows a system designed in accordance with this further aspect of the invention and comprising a construction measuring appliance 100 and three reference point marks M, N, O which can be fitted in spaces. In this system comprising a construction measuring appliance 100 for measuring and marking spatial points in the context of construction and/or development—in particular interior finishing—of buildings and at least three reference point marks K, L, M, N, O which can be fitted in spaces and which each have a known pattern 30 indicating a discrete reference point, the construction measuring appliance has a base 110, and an upper part 120 mounted on the base 110 in a manner rotatable about a rotation axis. Furthermore, provision is made of a sighting unit 130, which is mounted on the upper part 120 in a manner pivotable about a pivoting axis and provides distance measuring functionality, having a laser source designed to emit a laser beam 140 in the direction of an aiming axis, and a laser light detector and also having an integrated digital camera aligned in the direction of the aiming axis. Furthermore, the construction measuring appliance 100 comprises an evaluation and control unit having image processing and storage means. In this case, a first and a second rotary drive make the upper part 120 and the sighting unit 130 drivable and alignable, and a spatial alignment of the sighting unit relative to the base 110 is detectable by means of two goniometers. Furthermore, the evaluation and control unit is connected to the laser source, the laser light detector and also the goniometers in such a way that a detected distance can be assigned to a corresponding alignment and relative coordinates for spatial points can thus be determined. In accordance with the further aspect of the invention, the constructs on measuring appliance 100 now has a referencing functionality for referencing its own current location 42 and its own current orientation relative to the reference points which are situated within visual and measurement range of the construction measuring appliance 100 and the absolute positions of which in a desired coordinate system are known, in particular already calibrated from a previous location 41 and stored, wherein in the context of the referencing functionality after initiation in a manner automatically controlled by the evaluation and control unit the following proceed: acquiring a plurality of camera images in different alignments or the sighting unit 130 within a defined search field of view range, and evaluating the acquired camera images by image processing with regard to identifying the reference point marks K, L, M, N, O in the acquired camera images on the basis of the respectively known patterns thereof. This is additionally followed by determining the respective image positions of the identified reference point marks K, L, M, N, O in the acquired camera images, and deriving solid angles with respect to the reference points respectively indicated by the reference point marks K, L, M, N, O identified in the camera images on the basis of the respective image positions of the reference point marks K, L, M, N, O and the respective alignment of the sighting unit 130 in which the respective camera image is acquired. This is likewise followed by progressively moving to the solid angles respectively derived for the reference points and determining the respective relative coordinates of the reference points, and referencing the own current location 42 and the own current orientation relative to the reference points on the basis of the absolute positions respectively known for the reference points in the desired coordinate system and the relative coordinates respectively determined for the reference points.

In the system, the reference point marks K, L, M, N, O each have a pattern carrier, on which the known pattern 30 is applied, in particular printed, and an identification region provided on the pattern carrier and serving for identifying the own individual identity of the respective reference points, in particular wherein the identification region is embodied as a printed identification number or as a barcode or as a free field 31 provided for manual inscription.

In particular, with the system, in the context of the referencing functionality in addition to the step of determining the respective image positions, the respective identities of the reference points are determined by reading out the respective identification regions of the reference point marks K, L, M, N, O identified in the acquired camera images with the aid of image processing, and the absolute positions and the relative coordinates for the respective reference points are assigned in pairs with the aid of the determined identities of the reference points.

Furthermore, in the context of the referencing functionality, it is possible to carry out pairwise assignment of the absolute positions and of the relative coordinates for the respective reference points in accordance with a method from the publication WO 2008/138541, wherein a referencing of a measuring appliance 100 can be carried out on the basis of a spatial distribution of known measurement points.

In addition, in the context of the referencing functionality, for the steps of progressively moving to and respectively determining the relative coordinates of the reference points, a fine sighting method in accordance with the European patent application having the application number 10168771.3 can be employed, wherein, on the basis of a known pattern 30, a reference point mark K, L, M, N, O can be identified by means of image processing and the sighting unit can be automatically aligned with a target point situated in a known spatial relationship with respect to said pattern.

In particular, a construction measuring appliance 100, designed and provided for use in a system described above, can therefore comprise a base 110, an upper part 120 mounted on the base 110 in a manner rotatable about a rotation axis, a sighting unit 130, which is mounted on the upper part 120 in a manner pivotable about a pivoting axis and provides distance measuring functionality, having a laser source designed to emit a laser beam 140 in the direction of an aiming axis, and a laser light detector and also having an integrated digital camera aligned in the direction of the aiming axis, and an evaluation and control unit having image processing and storage means. A first and a second rotary drive make the upper part 120 and the sighting unit 130 drivable and alignable, a spatial alignment of the sighting unit relative to the base 110 is detectable by means of two goniometers, and the evaluation and control unit is connected to the laser source, the laser light detector and also the goniometers in order to assign a detected distance to a corresponding alignment and thus to determine relative coordinates for spatial points. The construction measuring appliance 100 has a referencing functionality for referencing its own current location 42 and its own current orientation relative to reference points—indicated by respectively known patterns of reference point marks which are situated within visual and measurement range of the construction measuring appliance 100—the absolute positions of which in a desired coordinate system are known, in particular already calibrated from a previous location 41 and stored, wherein in the context of the referencing functionality after initiation in a manner automatically controlled by the evaluation and control unit the following proceed: acquiring a plurality of camera images in different alignments of the sighting unit 130 within a defined search field of view range, and evaluating the acquired camera images by image processing with regard to identifying the reference point marks in the acquired camera images on the basis of the respectively known patterns thereof. This is furthermore followed by determining the respective image positions of the identified reference point marks in the acquired camera images, and deriving solid angles with respect to the reference points respectively indicated by the reference point marks identified in the camera images on the basis of the respective image positions of the reference point marks and the respective alignment of the sighting unit 130 in which the respective camera image is acquired. There additionally proceed: progressively moving to the solid angles respectively derived for the reference points and determining the respective relative coordinates of the reference points, and referencing the own current location 42 and the own current orientation relative to the reference points on the basis of the absolute positions respectively known for the reference points in the desired coordinate system and the relative coordinates respectively determined for the reference points.

FIG. 7 shows a possible exemplary embodiment of two reference point marks K, L having a pattern 30 and respectively a free field 31, in which a user can apply, in particular paint, an individual pattern. With a system comprising a construction measuring appliance 100 and reference point marks K, L, in a search mode, a space can be visually scanned (camera image) and, with the aid of image processing, reference point marks K, L in range can be sought and measured. For this purpose, by way of example, a digital pattern 30 of a reference point mark K stored in the data processing is compared with the camera images by an autocorrelation technique. The sighting can likewise be performed automatically by the system by virtue of the fact that an autocorrelation determines a maximum of a pattern-image correlation and, at a location which is in a known spatial relationship with respect to a pattern 30, e.g. a barcode, are carries out a distance measurement. In this case, the barcode 30 can be identified during the automatic search for the reference point 35 stored in the database. Furthermore, the searching and sighting method can be simplified starting from a third reference point 35, and a transition can be made to selective searching (i.e. with prior assumptions being made), since, from a provisional standpoint already determined by means of two first reference points 35, the search can be restricted to the reference points 35 situated in the vicinity. In principle, this search is also possible without precoded reference point marks K. For this purpose, the user applies e.g. a handwritten identification in the free field 31 of the reference point marks L. This has the consequence that when the coordinates of the check point 35 are stored, an image of the identifier applied by the user is acquired and concomitantly stored.

As already mentioned, however, even without any measurement mark identifier—enabling unique identification—in principle it is possible to perform a general search for the reference points from the database of the potential reference points by comparing the measured actual distances between the reference points—calibrated anew after a change of location—with the desired distances between the stored reference points which result from the database coordinates, analogously to the method described in the publication WO 2008/138541.

If a second such measuring appliance is situated in the space, which appliance was stationed with the same geometry and was not repositioned, the appliances can reestablish the station of the repositioned appliance by mutual measurement. If this is intended to take place automatically, two-way communication of the appliances between one another is required. Just for the redundancy and thus also for the accuracy and reliability of determining the new station—i.e. the new standpoint of the repositioned appliance—it is then actually still necessary to carry out sighting of reference points positioned in a known manner in the previously defined coordinate system. In this case, the method of searching for the known reference points is simplified considerably because then once again—as already described above—a selective search for the reference points (i.e. taking account of the provisionally determined standpoint of the repositioned appliance) can be applied. Consequently, the search can thus be restricted to the reference points 35 situated in the vicinity, or rough new relative positions—i.e. viewed from the provisionally determined standpoint—can already be determined for the known reference points and be included for the search.

If goes without saying that these figures illustrated only illustrate possible exemplary embodiments schematically. The various approaches can likewise be combined with one another and also with methods from the prior art.

What is claimed is:

1. A measuring appliance for measuring and marking spatial points of a construction including interiors of buildings, comprising:
    a base;
    a sighting unit, which is rotatable and pivotable relative to the base and provides distance measuring functionality, having a laser source designed to emit a laser beam in the direction of an aiming axis, and a laser light detector;
    an evaluation and control unit; and
    a display, wherein:
        a spatial alignment of the sighting unit relative to the base is detectable by means of two goniometers;

the evaluation and control unit is connected to the laser source, the laser light detector, and also the goniometers in order to assign a detected distance to a corresponding alignment and thus to determine coordinates for spatial points;

input or measured spatial points, which form a spatial point set, can be stored;

a plan view representation or spatial representation of at least some spatial points from the spatial point set can be displayed, wherein said spatial points are at least partly connected by lines;

the measuring appliance has a representation-changing functionality, in the course of which, depending on a line selected from the lines displayed in the plan view representation or the spatial representation by the user, in a manner automatically controlled by the evaluation and control unit:

a virtual plane is defined by the selected line and a direction predefined as vertical;

a subset of spatial points which lie within a buffer zone lying within defined limits in front of and behind the virtual plane and is selected from the spatial point set; and an elevation representation of exclusively such spatial points which belong to the selected subset of spatial points is displayed on the display.

2. The measuring appliance as claimed in claim 1, wherein the buffer zone extends in front of and behind the virtual area as far as a defined maximum distance from the virtual area wherein a value for the maximum distance is fixedly predefined or can be predefined by the user in a range of between 0 and 100 cm; and/or in the context of the elevation representation exactly all those spatial points which belong to the subset are represented, wherein said spatial points are at least partly connected by lines.

3. The measuring appliance as claimed in claim 1, wherein the buffer zone extends in front of and behind the virtual area as far as a defined maximum distance from the virtual area wherein a value for the maximum distance is fixedly predefined or can be predefined by the user in a range of between 10 and 50 cm.

4. The measuring appliance as claimed in claim 1, wherein as a result of the one line being selected by the representation-changing functionality is started automatically and thereupon automatically.

5. The measuring appliance as claimed in claim 1, wherein as a result of the one line being selected by the user by double clicking with the aid of input means the representation-changing functionality is started automatically and thereupon directly in response to the selection by the user the virtual area is defined, the subset is selected and a change is made to the elevation representation and this is displayed on the display.

6. The measuring appliance as claimed in claims 1, wherein:

the spatial representation is defined as a three-dimensional perspective representation of spatial points;

the plan view representation is defined as a two-dimensional representation of spatial points projected onto a plane assumed to be aligned horizontally; and the elevation representation is defined as a two-dimensional representation of spatial points projected onto a plane assumed to be aligned vertically.

7. The measuring appliance as claimed in claim 1, wherein the direction predefined as vertical can be defined by:

inclination sensor means designed for determining the inclination relative to the Earth's gravitational field vector about two axes and for communicating the measurement data thereof to the evaluation and control unit; and/or precalibration of a reference situated with known outer alignment, or of a reference plane assumed to be aligned horizontally or vertically, and resultant derivation of the direction predefined as vertical by the evaluation and control unit.

8. The measuring appliance as claimed in claim 7, wherein the inclination sensor means are integrated into the base and the precalibration of a reference situated with known outer alignment includes two points of a plumb rod or plumb bob suspended in oscillating fashion.

9. A method for changing the representation from a plan view representation or spatial representation displayed on a display of a measuring appliance to an elevation representation, wherein the measuring appliance comprises:

a base, a sighting unit, which is rotatable and pivotable relative to the base and provides distance measuring functionality, having a laser source designed to emit a laser beam in the direction of an aiming axis, and a laser light detector, an evaluation and control unit, and a display, wherein:

a spatial alignment of the sighting unit relative to the base is detectable by means of two goniometers:

the evaluation and control unit is connected to the laser source, the laser light detector and also the goniometers in order to assign a detected distance to a corresponding alignment and thus to determine coordinates for spatial points;

input or measured spatial points, which form a spatial point set, are stored;

the plan view representation or spatial representation of at least some spatial points from the spatial point set is displayed, wherein said spatial points are at least partly connected by lines, depending on a line selected from the lines displayed in the plan view representation or the spatial representation by the user, automatically:

a virtual plane is defined by the selected line and a direction predefined as vertical;

a subset of spatial points which lie within a buffer zone lying within defined limits in front of and behind the virtual plane is selected from the spatial point set; and an elevation representation of exclusively such spatial points which belong to the selected subset of spatial points is displayed on the display.

10. The method as claimed in claim 9, wherein the buffer zone extends in front of and behind the virtual area as far as a defined maximum distance from the virtual area.

11. The method as claimed in claim 9, wherein:

the buffer zone extends in front of and behind the virtual area as far as a defined maximum distance from the virtual area and a value for the maximum distance is fixedly predefined or can be predefined by the user in a range of between 0 and 100 cm, and/or in the context of the elevation representation exactly all those spatial points which belong to the subset are represented, wherein said spatial points are at least partly connected by lines.

12. The method as claimed in claim 9, wherein the buffer zone extends in front of and behind the virtual area as far as a defined maximum distance from the virtual area and a value for the maximum distance is predefined by the user in a range of between 10 and 50 cm.

13. The method as claimed in claim 9, wherein as a result of the one line being selected by the user an automatic progression of the method is initiated and started and thereupon automatically and the subset is selected and a change is made to the elevation representation and this is displayed on the display.

14. The method as claimed in claim 9, wherein as a result of the one line being selected by the user by double clicking with the aid of input means an automatic progression of the method is initiated and started and thereupon directly in response to the selection by the user the virtual area is therefore defined, the subset is selected and a change is made to the elevation representation and this is displayed on the display.

15. The method as claimed in claim 9, wherein:
the spatial representation is defined as a three-dimensional perspective representation of spatial points;
the plan view representation is defined as a two-dimensional representation of spatial points projected onto a plane assumed to be aligned horizontally; and
the elevation representation is defined as a two-dimensional representation of spatial points projected onto a plane assumed to be aligned vertically.

16. A computer program product comprising program code, stored on a non-transitory computer-readable medium, for carrying out the method for changing the representation from a plan view representation or spatial representation displayed on a display of a measuring appliance to an elevation representation as claimed in 9.

17. A system comprising a construction measuring appliance for measuring and marking spatial points in the context of construction and/or development including interior finishing of buildings and at least three reference point marks which can be fitted in spaces and which each have a known pattern indicating a discrete reference point, wherein the construction measuring appliance comprises:
a base;
an upper part mounted on the base in a manner rotatable about a rotation axis;
a sighting unit, which is mounted on the upper part in a manner pivotable about a pivoting axis and provides distance measuring functionality, having a laser source designed to emit a laser beam in the direction of an aiming axis, and a laser light detector and also having an integrated digital camera aligned in the direction of the aiming axis; and
an evaluation and control unit having image processing and storage means;
a first and a second rotary drive make the upper part and the sighting unit drivable and alignable;
a display;
a spatial alignment of the sighting unit relative to the base is detectable by means of two goniometers; and
the evaluation and control unit is connected to the laser source, the laser light detector and also the goniometers in order to assign a detected distance to a corresponding alignment and thus to determine relative coordinates for spatial points,
input or measured spatial points, which form a spatial point set, can be stored;
a plan view representation or spatial representation of at least some spatial points from the spatial point set can be displayed, wherein said spatial points are at least partly connected by lines; wherein:
the construction measuring appliance has:
a representation-changing functionality, in the course of which, depending on a line selected from the lines displayed in the plan view representation or the spatial representation by the user, in a manner automatically controlled by the evaluation and control unit:
a virtual plane is defined by the selected line and a direction predefined as vertical;
a subset of spatial points which lie within a buffer zone lying within defined limits in front of and behind the virtual plane and is selected from the spatial point set; and
an elevation representation of exclusively such spatial points which belong to the selected subset of spatial points is displayed on the display;
a referencing functionality for referencing its own current location and its own current orientation relative to the reference points which are situated within visual and measurement range of the construction measuring appliance and the absolute positions of which in a desired coordinate system are known, including calibration from a previous location and stored, wherein in the context of the referencing functionality after initiation in a manner automatically controlled by the evaluation and control unit the following steps proceed:
acquiring a plurality of camera images in different alignments of the sighting unit within a defined search field of view range;
evaluating the acquired camera images by image processing with regard to identifying the reference point marks in the acquired camera images on the basis of the respectively known patterns thereof;
determining the respective image positions of the identified reference point marks in the acquired camera images;
deriving solid angles with respect to the reference points respectively indicated by the reference point marks identified in the camera images on the basis of:
the respective image positions of the reference point marks; and
the respective alignment of the sighting unit in which the respective camera image is acquired;
progressively moving to the solid angles respectively derived for the reference points and determining the respective relative coordinates of the reference points; and
referencing the own current location and the own current orientation relative to the reference points on the basis of the absolute positions respectively known for the reference points in the desired coordinate system and the relative coordinates respectively determined for the reference points.

18. The system as claimed in claim 17, wherein the reference point marks each have:
a pattern carrier, on which the known pattern is applied; and an identification region provided on the pattern carrier and serving for identifying the own individual identity of the respective reference points.

19. The system as claimed in claim 17, wherein the reference point marks each have:
a pattern carrier, on which the known printed pattern is applied; and
an identification region provided on the pattern carrier and serving for identifying the own individual identity of the respective reference points, wherein the identification region is embodied as a printed identification number or as a barcode or as a free field provided for manual inscription.

20. The system as claimed in claim 19, wherein in the context of the referencing functionality:
in addition to the step of determining the respective image positions, the respective identities of the reference points are determined by reading out the respective identification regions of the reference point marks identified in the acquired camera images with the aid of image processing; and
the absolute positions and the relative coordinates for the respective reference points are assigned in pairs with the aid of the determined identities of the reference points.

21. A construction measuring appliance for a system as claimed in claim 17, comprising:
a base;
an upper part mounted on the base in a manner rotatable about a rotation axis;
a sighting unit, which is mounted on the upper part, in a manner pivotable about a pivoting axis and provides distance measuring functionality, having a laser source designed to emit a laser beam in the direction of an aiming axis, and a laser light detector and also having an integrated digital camera aligned in the direction of the aiming axis; and
an evaluation and control unit having image processing and storage means;
a first and a second rotary drive make the upper part and the sighting unit drivable and alignable;
a display;
a spatial alignment of the sighting unit relative to the base is detectable by means of two goniometers; and
the evaluation and control unit is connected to the laser source, the laser light detector and also the goniometers in order to assign a detected distance to a corresponding alignment and thus to determine relative coordinates for spatial points,
input or measured spatial points, which form a spatial point set, can be stored;
a plan view representation or spatial representation of at least some spatial points from the spatial point set can be displayed, wherein said spatial points are at least partly connected by lines; wherein the construction measuring appliance has:
a representation-changing functionality, in the course of which, depending on a line selected from the lines displayed in the plan view representation or the spatial representation by the user, in a manner automatically controlled by the evaluation and control unit:
a virtual plane is defined by the selected line and a direction predefined as vertical;
a subset of spatial points which lie within a buffer zone lying within defined limits in front of and behind the virtual plane and is selected from the spatial point set; and
an elevation representation of exclusively such spatial points which belong to the selected subset of spatial points is displayed on the display;
a referencing functionality for referencing its own current location and its own current orientation relative to reference points, indicated by respectively known patterns of reference point marks which are situated within visual and measurement range of the construction measuring appliance, the absolute positions of which in a desired coordinate system are known, including already calibrated from a previous location and stored, wherein in the context of the referencing functionality after initiation in a manner automatically controlled by the evaluation and control unit the following steps proceed:
acquiring a plurality of camera images in different alignments of the sighting unit within a defined search field of view range;
evaluating the acquired camera images by image processing with regard to identifying the reference point marks in the acquired camera images on the basis of the respectively known patterns thereof;
determining the respective image positions of the identified reference point marks in the acquired camera images;
deriving solid angles with respect to the reference points respectively indicated by the reference point marks identified in the camera images on the basis of:
the respective image positions of the reference point marks; and
the respective alignment of the sighting unit in which the respective camera image is acquired;
progressively moving to the solid angles respectively derived for the reference points and determining the respective relative coordinates of the reference points; and
referencing the own current location and the own current orientation relative to the reference points on the basis of the absolute positions respectively known for the reference points in the desired coordinate system and the relative coordinates respectively determined for the reference points.

* * * * *